Figure 1:
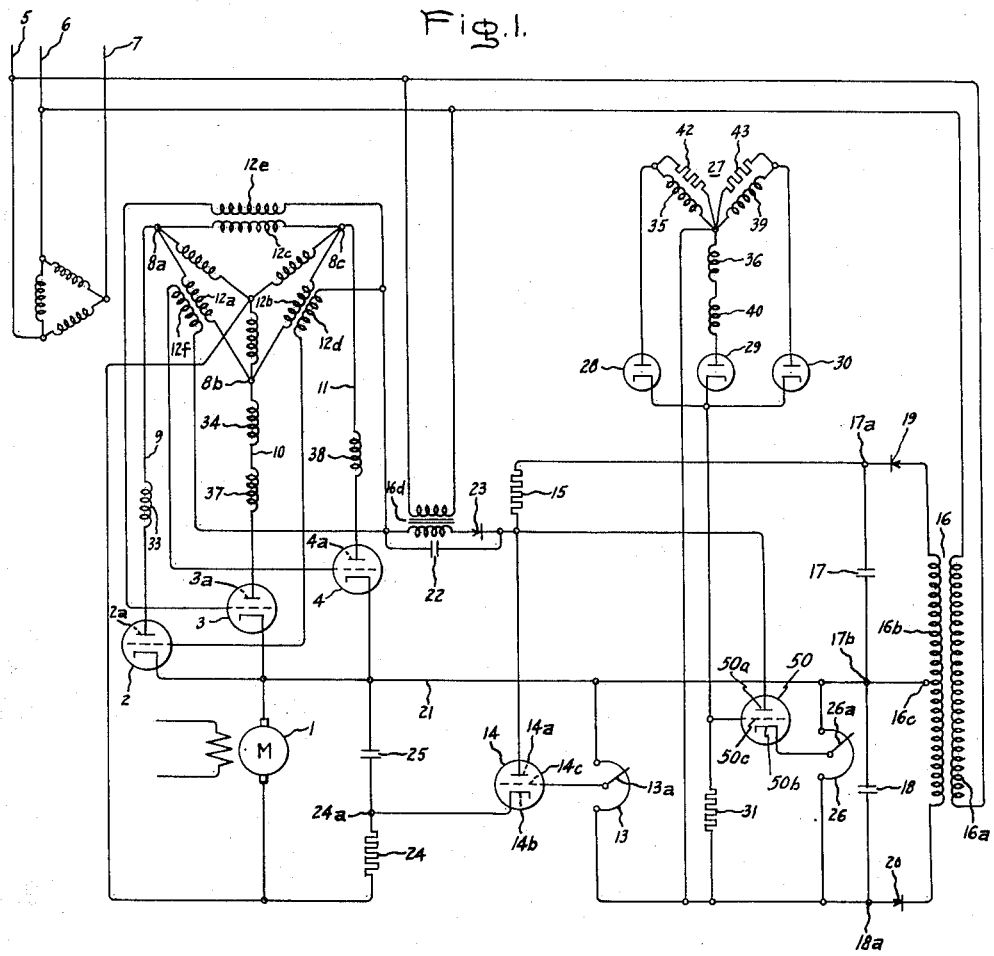

March 23, 1954     E. F. KUBLER     2,673,322
CURRENT MEASURING DEVICE

Filed Dec. 30, 1952     2 Sheets-Sheet 1

Inventor:
Ernest F. Kubler,
by
His Attorney.

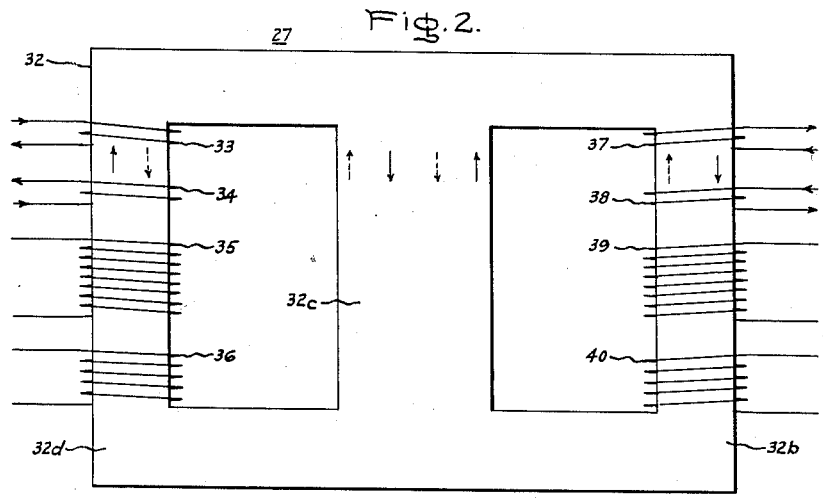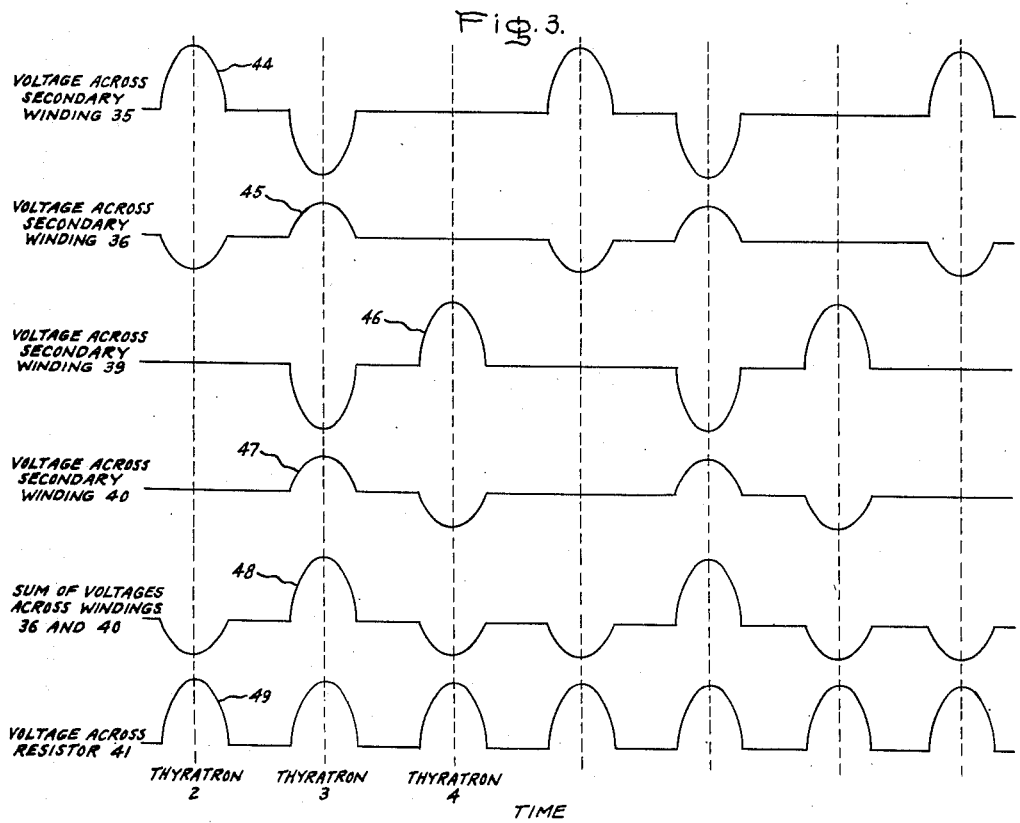

Patented Mar. 23, 1954

2,673,322

UNITED STATES PATENT OFFICE 2,673,322

CURRENT MEASURING DEVICE

Ernest F. Kubler, Schenectady, N. Y., assignor to General Electric Company, a corporation of New York Application December 30, 1952, Serial No. 328,781

4 Claims. (Cl. 321—32)

This invention relates to devices for measuring rectified three-phase currents, and more particularly to devices for measuring the rectified current in each of the three phases, and it has for an object the provision of a simple, reliable, inexpensive, and improved device of this character.

In rectifier applications it is necessary to limit the current in each rectifying path to a predetermined value in order to prevent damage to or destruction of the rectifier. This has been accomplished in bi-phase rectifier applications by means of a current limiting circuit which is controlled by means of a direct control voltage which is derived by rectification from a voltage that is induced in the secondary winding of a single current transformer having two primary windings, one in the anode circuit of each of the rectifiers. These primary windings are poled so that the rectified anode current pulse of one rectifier produces a flux in one direction in the core and the anode pulse of the second rectifier produces flux in the opposite direction. The result is that the flux in the core is alternating and the voltage induced in the secondary winding is an accurate measurement of the rectified currents in the anode circuits. Consequently, the rectified voltage which is derived from this voltage induced in the secondary winding is also an accurate measurement of the rectified currents in the anode circuits.

If the primary windings of a conventional three-phase current transformer are connected in the anode circuits of a three-phase rectifier, the flux in the core will have a direct component. This will produce saturation of the core and consequently the voltage induced in the secondary winding will not be a true, or even a reasonably close measure, of the magnitude of the rectified currents in the anode circuits of the three phases and therefore cannot be used to control the current limit circuit.

Accordingly, a further and more specific object of this invention is the provision of a three-phase current transformer of which the secondary voltage will be an accurate measurement of the rectified currents in each of the three phases of the rectifier.

In carrying the invention into effect in one form thereof, a transformer is provided with a core having a central leg and two outside legs. On each of the two outside legs are provided two primary windings and two secondary windings. Two of the primary windings which are mounted on opposite outside legs of the core are each connected in a different phase of the three-phase main rectifier, and the two remaining primary windings, which are also provided on opposite outside legs, are connected in series relationship with each other in the third phase. Two of the secondary windings which are provided on opposite outside legs are connected in series relationship with each other, and an auxiliary rectifier is connected in circuit with those two windings. Second and third auxiliary rectifiers are connected in circuit with the third and fourth secondary windings. The cathodes of these auxiliary rectifiers are connected to a common load circuit in which is connected a resistor. The voltage which appears across this resistor is an accurate indication of the rectified current in each phase of the main power rectifier.

For a better and more complete understanding of the invention, reference should now be had to the following specification and to the accompanying drawings of which, Fig. 1 is a simple diagrammatical illustration of an embodiment of the invention in a control system in which a direct current motor is supplied from a three-phase rectifier;

Fig. 2 is a diagrammatical sketch of the three-phase current transformer which is utilized to produce a voltage which is an accurate indication of the rectified current in each of the three phases of the main rectifier; and Fig. 3 is a chart of characteristic curves which facilitate an understanding of the operation of the transformer.

Referring now to the drawing, the armature of a direct current motor 1 is supplied from a three-phase rectifier which is illustrated as comprising three controlled rectifier valves 2, 3, and 4, which are preferably thyratrons. These thyratrons may be of any suitable type such, for example, as the well-known GL5545. This three-phase rectifier is supplied from a suitable three-phase source which is represented by the three supply lines 5, 6, and 7, through an anode transformer 8. As shown, the transformer 8 has a delta-connected primary winding and a Y-connected secondary winding to the terminals 8a, 8b, and 8c, of which the anodes 2a, 3a, and 4a, of the thyratrons are connected by means of conductors 9, 10, and 11, respectively.

For the purpose of controlling the current which is supplied to the armature of the motor, means are provided for supplying to the grid of each of the thyratrons a voltage having an alternating component and a variable direct component. The variable direct component controls the phase of the firing point of the thyratron in each positive half-cycle of its anode voltage and this serves to control the average magnitude of the current conducted by each thyratron.

The alternating component is supplied by means of a three-phase grid voltage transformer 12 which is provided with primary windings 12a, 12b, and 12c, which are connected across the secondary terminals 8a, 8b, and 8c, of the main anode transformer, and secondary windings 12d, 12e, and 12f, which are connected in the grid to cathode circuits of thyratrons 2, 3, and 4, respectively. Since each of the grid transformer primary windings 12a, 12b, and 12c, is connected across two of the secondary phase windings of the anode transformer, the voltages induced in the secondary windings of the grid transformers will be displaced approximately 90 electrical degrees from the voltages of the terminals 8a, 8b, and 8c, of the anode transformer. In other words, the alternating component voltage which is supplied to the grid of each thyratron will lag the anode voltage of such thyratron approximately 90 degrees.

The variable direct component of the grid voltage is produced by means of a control unit which is illustrated as comprising a potentiometer 13, an electric valve 14, and a resistor 15. The potentiometer is supplied from a suitable source of direct control voltage. This source is illustrated as comprising a control voltage transformer 16 having a single-phase primary winding 16a which is connected across the main supply conductors 5 and 6, and a mid-tapped secondary winding 16b. A pair of capacitors 17 and 18 are connected in series relationship with each other, and their outside terminals 17a and 18a are connected through rectifiers 19 and 20 to the outside terminals of the secondary winding 16b. To the mid-point 16c of the secondary winding are connected the common terminals 17b of the capacitors and the common cathode terminal 21 of the thyratrons. Thus the two capacitors serve as a voltage divider with half the secondary peak voltage appearing across each capacitor.

The potentiometer 13 is connected across capacitor 18. Its slider 13a is connected to the grid 14c of valve 14 of which the anode 14a is connected through resistor 15 to the positive terminal 17a of the capacitor 17. The cathode to grid circuit of the thyratrons includes the capacitor 17 and resistor 15 in series relationship and, consequently, a component of direct voltage equal to the difference of the voltages across capacitor 17 and resistor 15 is added to the alternating voltage component in the grid circuit.

In order to supply to the grids of the thyratrons a direct bias voltage which is sufficiently negative with respect to the cathode voltages to produce zero speed of the motor when the slider 13a of the potentiometer is moved to the most positive, i. e., extreme counterclockwise position, an additional unit is connected in the cathode grid circuit of the thyratrons. It comprises a transformer 16d, a capacitor 22, and a rectifier 23, connected in series therewith. The capacitor is charged to a predetermined constant voltage and is connected in the cathode to grid circuit of the thyratrons with its negative terminal toward the grids. Its voltage is sufficiently negative to bias the thyratrons to cut off when the slider 13a is in the zero speed position. Consequently, it is referred to as the zero speed bias capacitor.

Across the armature of the motor 1 is connected a ripple filter which comprises a resistor 24 and a capacitor 25 connected in series relationship and having their common terminal 24a connected to the cathode 14b of the speed control valve 14.

With the slider 13a in its extreme counterclockwise position, the grid voltage of the speed control valve 14 has its maximum positive value and the valve conducts and produces a voltage drop across resistor 15 which is negative toward the grids of the thyratrons. The result is that the voltages of the grids of the thyratrons are approximately equal to the voltage of the central terminal 17b of the voltage diveder. The additional negative bias voltage across capacitor 22 biases the thyratrons to cut off with the result that zero voltage is supplied to the motor and the motor is at standstill.

Movement of the slider to an intermediate speed position such, for example, as the 25% speed position which is illustrated in the drawing, makes the voltage of the grid 14c more negative with respect to the voltage of cathode 14b thereby decreasing the conduction of the valve and correspondingly decreasing the voltage drop across resistor 15. This increases the direct component of the thyratron grid voltage thereby causing the thyratrons to conduct and supply a voltage to the armature of the motor which causes it to accelerate from rest.

As its speed increases, its counter-voltage increases correspondingly and this causes the voltage of the cathode 14b to become less positive with respect to the voltage of grid 14c. Accordingly, the current conducted by valve 14 increases thereby increasing the voltage drop across resistor 15. This retards the firing point of the thyratrons in each positive half-cycle of anode voltage until a new balanced condition is established in which the speed of the motor corresponds to the setting of the potentiometer slider 13a.

For the purpose of limiting the current in the anode-cathode circuit of each of the thyratrons to a predetermined safe value, a control unit is provided for producing a control voltage proportional to the current in the anode-cathode circuit of each of the thyratrons, comparing it with a reference voltage and utilizing the difference of the reference and control voltages to decrease the direct component of the thyratron grid voltage.

The current limit reference voltage is produced by means of a potentiometer 26 which is connected across the capacitor 18 and which is provided with a slider 26a. For producing the control voltage proportional to the current in the anode-cathode circuits of the thyratrons, a three-phase current transformer 27, three auxiliary electric valves 28, 29, and 30, and a resistor 31 are provided. As illustrated in Fig. 2, the transformer 27 has a three-legged core 32 comprising two outside legs 32a and 32b and a central leg 32c. The outside leg 32a is provided with two primary windings 33 and 34 and with two secondary windings 35 and 36. Similarly, the outside leg 32b is provided with two primary windings 37 and 38 and with two secondary windings 39 and 40. Preferably the secondary windings 35 and 39 have the same number of turns and the secondary windings 36 and 40 each has half the number of turns of the secondary windings 35 and 39. The primary windings 33, 34, 37, and 38 all have the same number of turns. No windings are provided on the central leg 32c of the core. The primary winding 33 is connected in the anode circuit of thyratron 2 and is poled so that when the thyratron is conducting, current enters at the top terminal 33a with the result that flux is established in the core in the direction which is indicated by the heavy solid line arrows. The primary windings 34 and 37 are connected in series relationship with each other in the anode circuit of the thyratron 3 and they are poled to produce a flux in the direction indicated by the broken line arrows. Similarly, the primary winding 38 is connected in the anode circuit of the thyratron 4 and it is poled so that when the thyratron 4 is conducting, flux is produced in the core in the direction which is indicated by the lightline arrows. Thus when the first phase thyratron 2 is conducting the direction of the flux is up in the leg 32a and down in the center leg. When the second phase thyratron 3 is conducting the direction of the flux is down in the leg 32a and up in the leg 32b. The flux in the center leg is zero. When the third phase thyratron 4 is conducting, the direction of the flux is down in the leg 32b and up in the center leg. From the foregoing description it is seen that the flux produced in each core leg by the primary windings 33, 34, 37, and 38, is alternating and does not contain any direct component.

The secondary winding coils 35, 36, 39, and 40, are Y-connected with the coils 36 and 40 connected in series relationship in one of the legs of the Y. The auxiliary electric valves 28, 29, and 30, are respectively connected in corresponding legs of the Y-connected secondary winding as illustrated in Fig. 1. The resistor 31 is connected in the load circuit of the auxiliary valves between the common cathode connection and the neutral point of the secondary winding.

Loading resistors 42 and 43 are connected across the terminals of the secondary windings 35 and 39 respectively. The resistance of resistor 31 is relatively large in comparison with the resistance of resistors 42 and 43. The ratio is preferably within the range of between 10 and 20 to 1. For example, the resistor 31 may have a resistance of 10,000 ohms and each of the resistors 42 and 43 may have a resistance of 1,000 ohms.

The operation of the transformer 27 to produce across the resistor 31 a voltage which is an accurate measurement of the current in each phase of the main rectifier will be readily understood by referring to the chart of characteristic curves of Fig. 3 in which the curves 44, 45, 46, and 47, represent the voltages across the secondary windings 35, 36, 39, and 40. Abscissae of these curves represent time and consequently represent the successive periods of conduction of the first, second, and third phase thyratrons 2, 3, and 4, respectively.

During the period in which thyratron 2 is conducting, a flux is produced in the outside leg 32a and in the central leg of the core and a voltage is induced in the secondary winding 35 which is positive toward the anode of the auxiliary valve 28 as represented by the positive first half cycle of the curve 44 in Fig. 3. Simultaneously, a voltage is induced in the secondary winding 36, since it is mounted on the same core leg. However, the winding 36 is poled so that its voltage is negative toward the anode of auxiliary valve 29 as represented by the negative first half-cycle of curve 45. During this conduction period, no voltage is induced in either of the secondary windings 39 or 40 since they are mounted on leg 32b of the core. Thus the sum of the voltages across the series connected windings 36 and 40 is equal to the voltage across winding 36 and is negative toward the anode of auxiliary valve 29 as represented by the negative first half-cycle of curve 48. Thus, only the auxiliary valve 29 conducts during the period in which thyratron 2 is conducting and its current produces a voltage drop across resistor 31 which is represented by the first half-cycle of curve 49.

During the period in which thyratron 3 is conducting, the primary windings 34 and 37 are energized and fluxes are produced in both outside core legs. Voltages are again induced in secondary windings 35 and 36. Since the flux produced by primary winding 34 is in the reverse direction in the core leg 32a with respect to the flux which was produced by primary winding 33, the voltages induced in secondary windings 35 and 36 are reversed as indicated by the second half-cycles of curves 44 and 45. In other words, the voltage induced in secondary winding 35 is negative toward the anode of auxiliary valve 28 and the voltage induced in secondary winding 36 is positive toward the anode of auxiliary valve 29.

Simultaneously, a flux is produced by the primary winding 37 in core leg 32b and voltages are induced in secondary windings 39 and 40. The voltage induced in winding 39 is negative toward the anode of auxiliary valve 30 as represented by the first negative half cycle of curve 46. On the other hand, the voltage induced in winding 40 is positive toward the anode of auxiliary valve 29 as represented by the first positive half-cycle of curve 47. Since the voltages induced in windings 35 and 39 are negative toward the anodes of their respective auxiliary valves 28 and 30, these valves do not conduct. However, the sum of the voltages across the series connected windings 36 and 40 is positive toward the anode of valve 29 as represented by the positive second half-cycle of curve 48. Accordingly, valve 29 conducts and produces a voltage drop across resistor 31 which is represented by the second half-cycle of curve 49. Since each of secondary windings 36 and 40 has only half as many turns as each of the secondary windings 35, the magnitude of the voltage induced in each of windings 36 and 40 is half the magnitude of the voltage induced in coil 35. Consequently, the magnitude of the sum of the voltages induced in both secondary windings 36 and 40 is equal to the magnitude of the voltage induced in winding 35 as illustrated in Fig. 4 by the second half-cycle of curve 48 of which the amplitude is equal to the amplitude of the half-cycles of curve 44.

During the period in which the thyratron 4 is conducting, the primary winding 38 is energized. It produces a flux in core leg 32b which induces a voltage in secondary winding 39 that is positive toward the anode of auxiliary valve 30 and it produces a corresponding voltage in the secondary winding 40 which is negative toward the anode of auxiliary valve 29. These voltages are represented by the positive second half-cycle of curve 46 and the negative second half-cycle of curve 47. The voltage induced in winding 39 causes the auxiliary valve 30 to conduct and to produce a voltage drop across resistor 31 which is represented by the third half-cycle of curve 49.

Since the resistance of the load circuit resistor 31 is of the order of 10,000 ohms, the current which it conducts is relatively small, i. e., a few milliamperes. Consequently, the component of direct flux which this rectified current produces in the core is quite small. Furthermore, its effect is so completely overwhelmed by the relatively large alternating component produced by the relatively low resistance of the secondary loading resistors 42 and 43 that it is insignificant and may be neglected.

Thus since the direct flux produced in the core 32 by the rectified secondary currents is insignificant, the core is unsaturated and the voltage drop produced across the resistor 31 during the conducting period of each of the thyratrons is a reliably accurate measurement of the current in each such conducting period.

For the purpose of comparing the voltage drop across resistor 31 with the current limit reference voltage which is preset upon the potentiometer 26, an electric valve 50 is provided. Although this valve may be of any suitable type, it is preferably one-half of either a 6SN7GT or a 6SL7GT, of which the other half is the speed control valve 14. In other words, the two valves 14 and 50 are halves of a twin triode valve having a single envelope.

The anode 50a of valve 50 is connected to the same terminal 15a of resistor 15 to which the anode 14a of the speed control valve is connected. Its cathode 50b is connected to the slider 26a of the current limit potentiometer, and its grid 50c is connected to the positive terminal of the resistor 31.

As long as the current conducted by each of the thyratrons is less than the value which is preset on the potentiometer 26, the valve 50 is nonconducting and has no effect on the current limit circuit. However, if the current conducted by one of the thyratrons exceeds the predetermined value, the voltage drop across resistor 31 increases and makes the grid voltage of valve 50 sufficiently less negative to render the valve 50 conducting. As a result, the voltage drop across resistor 15 is increased and the direct component of the voltage supplied to the grids of thyratrons 2, 3, and 4 is reduced. This retards the firing point of the thyratrons in each positive half-cycle of their anode voltages with the result that the current that each thyratron conducts is correspondingly decreased. This action continues until the current conducted by each of the thyratrons is decreased to a value that is equal to or less than the value which is preset on the current limit potentiometer 26.

Although in accordance with the provisions of the patent statutes this invention is described as embodied in concrete form and the principle thereof has been explained together with the best manner in which it is now contemplated applying that principle, it will be understood that the drawings and description are merely illustrative and that the invention is not limited to the details thereof since alterations and modifications will readily suggest themselves to persons skilled in the art without departing from the true spirit of this invention or from the scope of the annexed claims.

What I claim as new and desire to secure by Letters Patent of the United States is:

1. In a control system comprising a three-phase source, a load circuit supplied from said source, three separate power rectifiers each having an anode connected in the circuit of a different one of said phases, and all having their cathodes connected to a terminal of said load circuit, means for measuring the currents in said phases comprising a transformer having a core provided with a central leg and first and second outside legs, a first primary winding connected in the first phase and mounted on said first outside leg, a second primary winding connected in a second phase and mounted on said second outside leg, third and fourth primary windings connected in series relationship in the third phase and each mounted on a different one of said outside legs, first and second secondary windings, each mounted on a different outside leg and a pair of secondary windings connected in series relationship with each other and each mounted on a different outside leg, a separate auxiliary rectifier connected in circuit with each of said first and second secondary windings, a third auxiliary rectifier connected in circuit with said third and fourth secondary windings, a common current measuring load circuit for said auxiliary rectifiers and a resistor connected in said current measuring circuit for producing across its terminal a voltage drop proportional to the current in each of said primary windings.

2. In a control system comprising a three-phase source, a load circuit supplied from said source, three separate power rectifiers each having an anode connected in the circuit of a different one of said phases, and all having their cathodes connected to a terminal of said load circuit, means for measuring the currents in said phases comprising a transformer having a core provided with a central leg and first and second outside legs, first and second primary windings connected in the circuits of a first and second of said phases respectively and mounted on said first and second outside legs respectively, third and fourth primary windings connected in series relationship in the circuit of the third phase and mounted on said first and second outside legs respectively, first and second secondary windings mounted on said first and second outside legs respectively and third and fourth secondary windings connected in series relationship with each other and each mounted on a corresponding outside leg, a separate auxiliary rectifier connected in circuit with each of said secondary windings, and a common current measuring load circuit for said auxiliary rectifiers including a resistor for producing across its terminals a voltage drop proportional to the current in each of said primary windings.

3. In a control system comprising a three-phase source, a load circuit supplied from said source, three separate power rectifiers each having an anode connected in the circuit of a different one of said phases, and all having their cathodes connected to a terminal of said load circuit, means for measuring the currents in said phases comprising a transformer having a core provided with a central leg and first and second outside legs, first and second primary windings connected in the circuits of a first and second of said phases respectively and mounted on said first and second outside legs respectively, third and fourth primary windings connected in series relationship in the circuit of the third phase and mounted on said first and second outside legs respectively and poled to produce opposed fluxes in said middle leg, first and second secondary windings mounted on said first and second outside legs respectively and both having substantially the same number of turns, third and fourth secondary windings connected in series relationship with each other and having approximately half the number of turns of said first and second secondary windings and each mounted on a corresponding outside leg, separate auxiliary rectifiers connected in circuit with each of said auxiliary rectifiers and a common current measuring load circuit for said auxiliary rectifiers including a resistor for producing across its terminals a voltage drop proportional to the current in each of said primary windings.

4. In a control system comprising a three-phase source, a load circuit supplied from said source, three separate power rectifiers each having an anode connected in the circuit of a different one of said phases, and all having their cathodes connected to a terminal of said load circuit, means for measuring the currents in said phases comprising a transformer having a core provided with a central leg and first and second outside legs, first and second primary windings connected in the circuits of a first and second of said phases respectively and mounted on said first and second outside legs respectively, third and fourth primary windings connected in series relationship in the circuit of the third phase and mounted on said first and second outside legs respectively, first and second secondary windings mounted on said first and second outside legs respectively, third and fourth secondary windings connected in series relationship with each other and each mounted on a corresponding outside leg, a plurality of separate auxiliary rectifiers, one connected in circuit with each of said secondary windings, a common current measuring load circuit for said auxiliary rectifiers including a resistor for producing across its terminals a voltage drop proportional to the current in each of said primary windings and first and second loading resistors connected across said first and second secondary windings respectively and having a resistance that is relatively low with respect to said load circuit resistor.

ERNEST F. KUBLER.

References Cited in the file of this patent

UNITED STATES PATENTS

| Number | Name | Date |
| --- | --- | --- |
| 2,373,297 | Dortort | Apr. 10, 1945 |
| 2,548,577 | Alexanderson | Apr. 10, 1951 |
| 2,572,648 | Mittag | Oct. 23, 1951 |